US011026132B2

United States Patent
Tang

(10) Patent No.: US 11,026,132 B2
(45) Date of Patent: Jun. 1, 2021

(54) COMMUNICATION METHOD, CORE NETWORK DEVICE, ACCESS NETWORK DEVICE, TERMINAL DEVICE, AND COMMUNICATION SYSTEM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 37 days.

(21) Appl. No.: 16/093,910

(22) PCT Filed: Jun. 12, 2016

(86) PCT No.: PCT/CN2016/085503
§ 371 (c)(1),
(2) Date: Oct. 15, 2018

(87) PCT Pub. No.: WO2017/214776
PCT Pub. Date: Dec. 21, 2017

(65) Prior Publication Data
US 2019/0116528 A1  Apr. 18, 2019

(51) Int. Cl.
*H04W 36/00* (2009.01)
*H04W 36/08* (2009.01)
(Continued)

(52) U.S. Cl.
CPC ... *H04W 36/0033* (2013.01); *H04W 36/0016* (2013.01); *H04W 36/00835* (2018.08);
(Continued)

(58) Field of Classification Search
CPC ... H04W 76/10; H04W 36/08; H04W 36/245; H04W 36/0016; H04W 36/385; H04W 36/18; H04W 36/0033
See application file for complete search history.

(56) References Cited

U.S. PATENT DOCUMENTS

| 8,626,154 B1 | 1/2014 | Oroskar |
| 2008/0076429 A1 | 3/2008 | Comstock |

(Continued)

FOREIGN PATENT DOCUMENTS

| CN | 1435963 A | 8/2003 |
| CN | 101022648 A | 8/2007 |

(Continued)

OTHER PUBLICATIONS

English translation of the Written Opinion of the International Search Authority in the international application No. PCT/CN2016/085503, dated Feb. 13, 2017.
(Continued)

*Primary Examiner* — Gbemileke J Onamuti
(74) *Attorney, Agent, or Firm* — Ladas & Parry LLP

(57) ABSTRACT

Disclosed by the embodiments of the present application are a communication method, core network device, access network device, terminal device, and communication system. Said communication method comprises: the core network device determining an access network device set, said access network device set comprising at least one access network device already accessed by the terminal device; said core network device and each access network device in said access network device set establishing a network connection for said terminal device. By means of the technical solution of the present application, each access network device in the access network device set establishes a network connection for the terminal device in advance, thereby allowing the terminal device to move within a range of coverage of at (Continued)

least one access network device, reducing communication delays.

18 Claims, 6 Drawing Sheets

(51) Int. Cl.
   *H04W 36/38* (2009.01)
   *H04W 76/10* (2018.01)
   *H04W 36/18* (2009.01)
   *H04W 36/24* (2009.01)

(52) U.S. Cl.
   CPC .......... *H04W 36/08* (2013.01); *H04W 36/18* (2013.01); *H04W 36/245* (2013.01); *H04W 36/385* (2013.01); *H04W 76/10* (2018.02)

(56) References Cited

U.S. PATENT DOCUMENTS

| | | |
|---|---|---|
| 2010/0062779 A1 | 3/2010 | Bienas |
| 2012/0147854 A1 | 6/2012 | Jalil |
| 2014/0120908 A1 | 5/2014 | Oroskar et al. |
| 2014/0254356 A1* | 9/2014 | Jeong ............... H04L 47/20 370/229 |
| 2014/0254550 A1* | 9/2014 | Salvador ........... H04W 36/245 370/331 |
| 2014/0293796 A1* | 10/2014 | Jeong ............... H04M 15/66 370/236 |

FOREIGN PATENT DOCUMENTS

| | | |
|---|---|---|
| CN | 102088718 A | 6/2011 |
| CN | 103596642 A | 2/2014 |
| JP | 2006280002 A | 10/2006 |

OTHER PUBLICATIONS

Supplementary European Search Report in the European application No. 16904895.6, dated Apr. 23, 2019.
International Search Report in international application No. PCT/CN2016/085503, dated Feb. 13, 2017.
Written Opinion of the International Search Authority in international application No. PCT/CN2016/085503, dated Feb. 13, 2017.
First Office Action of in corresponding Japanese application No. 2018-556992, dated Jan. 21, 2020.
"3rd Generation Partnership Poject; Technical Specification Group Radio Access Network; Evolved Universal Terrestrial Radio Access Network(E-UTRAN); S1 Application Protocol (S1AP) (Release 13)", 3GPP TS 36.413 V13.1.0 (Dec. 2015), section 8.1.
"3rd Generation Partnership Poject; Technical Specification Group Radio Access Network; Evolved Universal Terrestrial Radio Access Network(E-UTRAN); X2 application protocol (X2AP) (Release 13)",3GPP TS 36.423 V13.2.0 (Dec. 2015), section 8.6.
First Office Action of the European application No. 16904895.6, dated Jan. 3, 2020.
Decision of Refusal of the Japanese application No. 2018-556992, dated Jun. 23, 2020.
First Office Action of the Indian application No. 201817043325, dated Aug. 17, 2020.
Second Office Action of the European application No. 16904895.6, dated Aug. 14, 2020.
First Office Action of the Taiwanese application No. 106118607, dated Feb. 8, 2021.

\* cited by examiner

100

200

COMMUNICATION METHOD, CORE NETWORK DEVICE, ACCESS NETWORK DEVICE, TERMINAL DEVICE, AND COMMUNICATION SYSTEM

RELATED APPLICATION

This application is an application under 35 U.S.C. 371 of International Application No. PCT/CN2016/085503 filed on Jun. 12, 2016, the entire contents of which are incorporated herein by reference.

TECHNICAL FIELD

The disclosure relates to the field of communications, and in particular to a communication method, a core network device, an access network device, a terminal device and a communication system.

BACKGROUND

In a Long Term Evolution (LTE) system, after a terminal device establishes a connection with a base station, of which a serving cell is under coverage, an S1 interface connection and context including information such as the established terminal bearer are established for the terminal device at the network side. Then, as long as the terminal device keeps connected with the base station, the S1 interface connection and the context for the terminal device are always maintained. When the terminal device performs handover between different cells, it is required to obtain the context information for the terminal device from a source cell, establish an S1 interface connection at a base station, of which a target cell is under coverage, and establish context for the terminal device.

Therefore, in the related art, when the terminal device is moved, firstly, a base station handover is performed, and the context information for the terminal device is obtained from the source cell; and when there is data to be transmitted, the target cell establishes the S1 interface connection for the terminal device and the context for the terminal device. Hence, the terminal device has a long delay in terms of data transmission after being moved.

SUMMARY

Embodiments of the present disclosure provide a communication method, a core network device, an access network device, a terminal device and a communication system, thereby reducing the communication delay after the terminal device is moved.

In accordance with a first aspect, a communication method is provided, which includes the following operations. A core network device determines an access network device set, where the access network device set includes at least one access network device which a terminal device has ever accessed. The core network device establishes a network connection for the terminal device with each access network device in the access network device set.

The core network device determines an access network device set including at least one access network device which the terminal device has ever accessed. The core network device here is a core network device which the terminal device currently accesses. The core network device establishes a network connection for the terminal device with each access network device in the core network device set. Accordingly, each access network device in the access network device set can establish a network connection with the terminal device in advance, so that the terminal device can be moved seamlessly within coverage of the at least one access network device, thereby reducing the communication delay.

In several possible implementations, the operation performed by the core network device of establishing the network connection for the terminal device with each access network device in the access network device set may include that, the core network device transmits a network connection request message to each access network device, to cause each access network device to establish the network connection with the terminal device based on the network connection request message.

The core network device may transmit the network connection request message to each access network device in the access network device set, so that each access network device in the access network device set establishes the network connection with the terminal device based on the network connection request message, which is not limited in the present disclosure. Accordingly, each access network device in the access network device set can establish a network connection with the terminal device in advance, so that the terminal device can be moved seamlessly within coverage of the at least one access network device, thereby reducing the communication delay.

It should be understood that, establishing the network connection with the terminal device may be implemented in one of the following ways: initiating the network connection request message by the core network device, or initiating a request by the access network device, which is not limited in the present disclosure.

In several possible implementations, the communication method may further include that, the core network device transmits context information to each access network device, to cause the terminal device to communicate with a network through the context information.

The core network device transmits the context information to each access network device in the access network device set. The context information is configured and generated for the terminal device by the access network device which the terminal device currently accesses when the terminal device initiates a service connection. The context information may be transmitted to the core network device in the network connection request message, or may be transmitted to the core network device in other ways, which is not limited in the present disclosure. Each access network device in the access network device set can receive and store the context information. After the terminal device is moved and accesses a first access network device (that is, any one of access network devices in the access network device set), the terminal device can communicate with a network through the context information stored by the first access network device. The network may be an access network or other network, which is not limited in the present disclosure. Accordingly, the terminal device can be moved seamlessly within the coverage of the at least one access network device, thereby reducing the communication delay.

In several possible implementations, the operation performed by the core network device of determining the access network device set may include that, the core network device acquires access history information or subscription information of the terminal device, and determines the access network device set based on the access history information or the subscription information.

The core network device acquires the access history information or the subscription information of the terminal device, and determines, based on the access history information or the subscription information, which access network devices are included in the access network device set. That is, the core network device determines, based on the access history information or the subscription information, which access network device(s) the terminal device is accustomed to access. The access network device set may be determined and notified to the core network device through the indication information and the like, by the core network device or other devices, based on the access history information or the subscription information of the terminal device, or other information. Accordingly, the core network device can determine the access network device set including the access network device which the terminal device has ever accessed, which is not limited in the present disclosure.

In several possible implementations, the operation performed by the core network device of acquiring the access history information or the subscription information of the terminal device may include that, the core network device receives the access history information or the subscription information from the terminal device.

The core network device may directly receive the access history information or the subscription information from the terminal device. For example, when the terminal device transmits a non-access stratum (NAS) signaling request message to the core network device, the signaling request message carries the access history information. Alternatively, the core network device receives the subscription information carried in various messages from the terminal device in an attach process, an area update process managed by the core network device, or a process of initiating a service request to establish NAS signaling connection. The present disclosure is not limited thereto.

In several possible implementations, the operation performed by the core network device of acquiring the access history information of the terminal device may include that, the core network device receives the access history information from the access network device to which the terminal device accesses The access network device may also receive the access history information forwarded by the access network device which the terminal device currently accesses, for example, a signaling connection is established between the terminal device and the access network device. The terminal device transmits the access history information to the access network device which the terminal device currently accesses, and reports the access history information to the core network device when the access network device initiates a service connection establishment request to the core network device. The present disclosure is not limited thereto.

In several possible implementations, the operation performed by the core network device of acquiring the access history information of the terminal device may include that, the core network device acquires location information of the terminal device, and determines the access history information based on a network topology diagram and the location information of the terminal device.

The core network device may acquire location information of the terminal device at each time point or in each time period from a positioning server, and determine the access history information of the terminal device based on the location information and the network topology diagram of the access network.

In several possible implementations, the access history information may include network statistic information of the access network device. The operation performed by the core network device of determining the access network device set based on the access history information may include that, the core network device determines the access network device set based on the network statistics information.

The core network device determines, based on the access history information of the terminal device, which access network devices are access network devices on which the terminal device is accustomed to camp. That is, the core network device can determine which access network device the terminal device may access next, and establish a network connection with the terminal device in advance, thereby reducing the communication delay.

In several possible implementations, the network statistics information may include access network information.

The access history information may be an ID(s) of an access network device(s) on which the terminal device has ever camped, or may be other information for indicating the access network device(s) which the terminal device has ever accessed. The present disclosure is not limited thereto. The core network device determines the access network device set 1 based on the ID(s) included in the access history information. Accordingly, the core network device transmits context information to each access network device on which the terminal device has ever camped, so that each access network device in the access network device set 1 can establish the network connection and context for the terminal device in advance.

In several possible implementations, the network statistics information may further include at least one of duration information or service type information.

The network statistics information further includes the at least one of the duration information or the service type information. That is, the access history information may include information of a duration for which the terminal device has ever camped on a certain access network device. Accordingly, the core network device can determine the priority of the access network device based on the information of the duration for which the terminal device camps on each access network device. For example, a time threshold may be set, and the access network device on which the terminal device camps for a duration exceeding the time threshold is determined to be an access network device in the access network device set. Accordingly, at least one access network device on which the terminal device has ever camped for a long time (that is, the terminal device is accustomed to camp) is determined to be the access network device set 2. The access network device set 2 here is a subset of the access network device set 1. Compared with a method for determining the access network device set only based on the ID, according to the embodiment of the present disclosure, the number of access network devices in the access network device set can be further reduced, it is avoided that the first access network on which the terminal device camps for a small number of times establishes the context information for the terminal device, thereby reducing resource waste.

Or, the access history information may further include a type of a service performed by the terminal device camping on a certain access network device. Accordingly, the core network device can determine the priority of the access network device based on the type of the service currently initiated by the terminal device. Accordingly, at least one access network device on which the terminal device is accustomed to camp when initiating the corresponding type of the service is determined to be the access network device set 3. The access network device set 3 here is a subset of the access network device set 1. According to the embodiment of the present disclosure, the number of access network devices in the access network device set can be further reduced, it is avoided that the first access network on which the terminal device camps for a small number of times establishes the context information for the terminal device, thereby saving resources.

In several possible implementations, the subscription information may include location area information. The operation performed by the core network device of determining the access network device set based on the subscription information may include that, the core network device determines the access network device set based on the location area information.

The subscription information includes area information related to the terminal device. Since a geographical location of the terminal device corresponds to coverage of the access network device, the core network device can determine, based on the location area information, the access network device on which the terminal device has ever camped, and determine at least one access network device on which the terminal device has ever camped to be the access network device set 5.

In several possible implementations, the subscription information may further include at least one of service type information or time information. The operation performed by the core network device of determining the access network device set based on the location area information may include that, the core network device determines the access network device set based on the location area information and at least one of the service type information or the time information.

The subscription information may further include a mapping relationship between each service of a UE and an area, that is, a mapping relationship between different service types and areas. The subscription information may further include a mapping relationship between the terminal device at different time points or in different time periods and the area. The core network device determines, based on the current time point or the current time period, the access network device(s) on which the terminal device is accustomed to camp, and sets the priority of the access network device, so as to determine at least one access network device with a higher priority to be the access network device set 6. The access network device set 6 here is a subset of the access network device set 5.

In accordance with a second aspect, a communication method is provided, which includes that, an access network device receives a network connection request message transmitted to each access network device in an access network device set by a core network device, where the access network device set includes at least one access network device which a terminal device has ever accessed; and establishes a network connection with the terminal device based on the network connection request message.

The access network device receives the network connection request message from the core network device, and the core network device transmits the network connection request message to each access network device in the access network device set. The access network device can establish the network connection with the terminal device in advance based on the network connection request message.

In several possible implementations, the communication method may further include that, the access network device receives context information, to cause the terminal device to communicate with a network through the context information.

The context information is configured and generated for the terminal device by the access network device which the terminal device currently accesses when the terminal device initiates a service connection. The context information may be transmitted to the core network device in the network connection request message, or may be transmitted to the core network device in other ways, and then transmitted to each access network device in the access network device set by the core network device; or the context information may be transmitted directly to an access network device in the access network device set after the access network device learns the access network device set. The present disclosure is not limited thereto. Each access network device in the access network device set can receive and store the context information. After the terminal device is moved and accesses a first access network device (that is, any one of access network devices in the access network device set), the terminal device can communicate with a network through the context information stored by the first access network device. The network may be an access network or other network, which is not limited in the present disclosure. Accordingly, the terminal device can be moved seamlessly within the coverage of the at least one access network device, thereby reducing the communication delay.

In accordance with a third aspect, a communication method is provided, which includes that, a terminal device acquires access history information or subscription information of the terminal device, and transmits the access history information or the subscription information to a core network device, to cause the core network device to determine an access network device set based on the access history information or the subscription information and establish a network connection for the terminal device with each access network device in the access network device set, where the access network device set includes at least one access network device which the terminal device has ever accessed.

The terminal device acquires the access history information or the subscription information. The access history information or the subscription information is used to indicate and determine the access network device set including the at least one access network device on which the terminal device has ever camped. The terminal device transmits the access history information or the subscription information to the core network device, so that the core network device determines the access network device set based on the access history information or the subscription information, and establishes the network connection for the terminal device with each access network in the access network device set. That is, the network connection with the terminal device is established in advance, so that the terminal device can be moved seamlessly within coverage of the at least one access network device, thereby reducing the communication delay.

In several possible implementations, the communication method may further include that, the terminal device communicates with a network through context information received through a first access network device in the access network device set.

The context information is configured and generated for the terminal device by the access network device which the terminal device currently accesses when the terminal device initiates a service connection, and is transmitted to the core network device through the network connection request message, or may be transmitted to the core network device in other ways, which is not limited in the present disclosure. Each access network device in the access network device set can receive and store the context information. After the terminal device is moved and accesses a first access network device (that is, any one of access network devices in the access network device set), the terminal device can communicate with a network through the context information stored by the first access network device. The network may be an access network or other network, which is not limited in the present disclosure. Accordingly, the terminal device can be moved seamlessly within the coverage of the at least one access network device, thereby reducing the communication delay.

In several possible implementations, the operation performed by the terminal device of transmitting the access history information or the subscription information to the core network device may include that, the terminal device transmits the access history information or the subscription information to the core network device via an access network device which the terminal device accesses.

The terminal device may transmit the access history information to the access network device which the terminal device currently accesses, which forwards the access history information to the core network device. For example, a signaling connection is established between the terminal device and the access network device. The terminal device transmits the access history information to the access network device which the terminal device currently accesses, and reports the access history information to the core network device when the access network device initiates a service connection establishment request to the core network device. The present disclosure is not limited thereto.

In several possible implementations, the access history information may include network statistics information of the access network device.

The access history information may include network statistics information of the access network device. The access history information may be an ID(s) of an access network device(s) on which the terminal device has ever camped, or may be other information for indicating the access network device which the terminal device has ever accessed. The present disclosure is not limited thereto. The terminal device transmits the ID of the access network device, so that the core network device determines the access network device set based on the ID included in the access history information. Accordingly, the core network device transmits context information to each access network device on which the terminal device has ever camped, so that each access network device in the access network device set can establish the network connection with the terminal device in advance.

In several possible implementations, the operation performed by the terminal device of transmitting the access history information to the core network device may include that, the terminal device transmits an NAS signaling request message to the core network device, where the NAS signaling request message carries the access history information.

The terminal device may directly transmit the access history information to the core network device. For example, when the terminal device carries the access history information in an NAS signaling request message and transmits the NAS signaling request message to the core network device.

In several possible implementations, the access history information may include network statistics information of the access network device.

In several possible implementations, the network statistics information may further include at least one of duration information or service type information.

The access history information includes an ID(s) of an access network device(s) on which the terminal device has ever camped, and further includes at least one of duration information or service type information. That is, the access history information includes information of a duration for which the terminal device has ever camped on a certain access network device. Or, the access history information may further include types of services performed by the terminal device when the terminal device has ever camped on different access network devices. Or, the access history information may further include a duration for which the terminal device performs a certain service when the terminal device has ever camped on a certain access network device. Or, the access history information may be durations for which the terminal device performs all services when the terminal device has ever camped on a certain access network device. The present disclosure is not limited thereto.

In several possible implementations, the subscription information may include location area information.

The subscription information includes area information related to the terminal device. It can be determined of which access network device the terminal device is under coverage based on a geographic location of the terminal device, so that the core network device can determine, based on the location area information, the access network device on which the terminal device has ever camped.

In several possible implementations, the operation performed by the terminal device of transmitting the subscription information to the core network device may include that, the terminal device transmits the subscription information to the core network device in an area update request message, an NAS signaling request message or an attach request message.

The terminal device reports the subscription information to the core network device in various messages transmitted to the core network device in an attach process, an area update process managed by the core network device, or a process of initiating a service request to establish NAS signaling connection. The present disclosure is not limited thereto.

In several possible implementations, the subscription information may further include at least one of service type information or time information.

The subscription information may further include a mapping relationship between each service of a UE and an area, that is, a mapping relationship between different service types and areas. The subscription information may further include a mapping relationship between the terminal device at different time points or in different time periods and the areas. The subscription information may include a mapping relationship between services of the terminal device at different time points or in different time periods and areas. The present disclosure is not limited thereto.

In accordance with a fourth aspect, a core network device is provided according to the present disclosure, which includes modules configured to execute the method in accordance within the first aspect.

In accordance with a fifth aspect, an access network device is provided according to the present disclosure, which includes modules configured to execute the method in accordance within the second aspect.

In a sixth aspect, a terminal device is provided according to the present disclosure, which includes modules configured to execute the method in accordance within the third aspect.

In a seventh aspect, a communication system is provided according to the present disclosure, which includes the core network device of the fourth aspect, the access network device of the fifth aspect, and the terminal device of the sixth aspect.

In accordance with an eighth aspect, a core network device is provided, which includes a processor and a memory. The memory stores a program, and the processor executes the program to perform the communication method according to the first aspect or any of the possible implementations of the first aspect.

In accordance with a ninth aspect, an access network device is provided, which includes: a processor and a memory. The memory stores a program, and the processor executes the program to implement the communication method according to the second aspect or any of the possible implementations of the second aspect.

In accordance with a tenth aspect, a terminal device is provided, which includes: a processor and a memory. The memory stores a program, and the processor executes the program to perform the communication method according to the third aspect or any of the possible implementations of the third aspect.

In accordance with an eleventh aspect, a computer storage medium is provided, which stores a program code for implementing the method of the first aspect or any possible implementation of the first aspect.

In accordance with a twelfth aspect, a computer storage medium is provided, which stores a program code for implementing the method of the second aspect or any possible implementation of the second aspect.

In accordance with a thirteenth aspect, a computer storage medium is provided, which stores a program code for implementing the method of the third aspect or any possible implementation of the third aspect.

Based on the above-described technical solution, in the embodiments of the disclosure, a core network device determines an access network device set including at least one access network device, and establishes a network connection for a terminal device with each access network device in the access network device set. Accordingly, each access network device in the access network device set can establish the network connection with the terminal device in advance, so that the terminal device can be moved seamlessly within coverage of the at least one access network device, thereby reducing the communication delay.

BRIEF DESCRIPTION OF DRAWINGS

In order to more clearly illustrate the technical solutions of the embodiments of the present disclosure, the drawings used in the embodiments or the related art description will be briefly described below. Apparently, the drawings in the following description only illustrate some embodiments of the present disclosure. Those skilled in the art can further obtain other drawings according to the drawings without any creative work.

DETAILED DESCRIPTION

Figure 1:
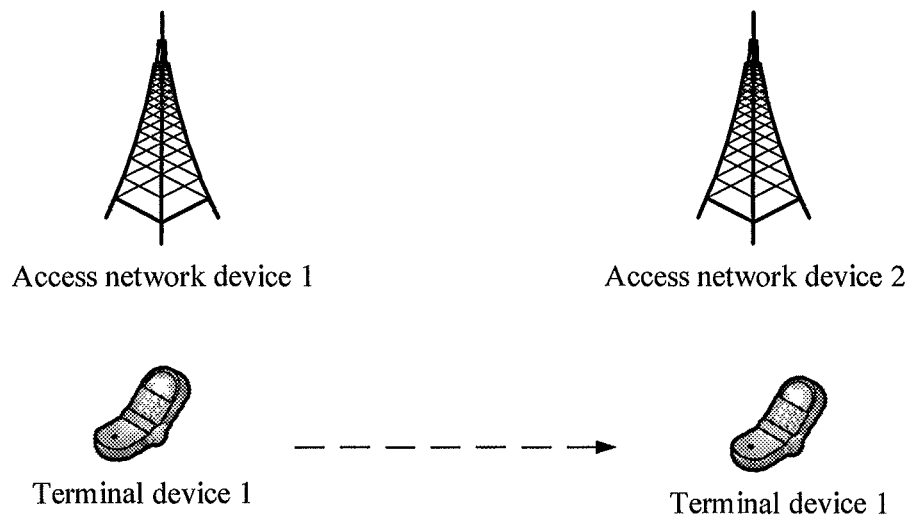
FIG. 1 illustrates a schematic diagram of an application scenario of the present disclosure.

The technical solutions in the embodiments of the present disclosure are clearly and completely described in the following with reference to the accompanying drawings in the embodiments of the present disclosure. It is apparent that the described embodiments are a part of the embodiments of the present disclosure rather than all of the embodiments. All other embodiments obtained by those skilled in the art based on the embodiments of the present disclosure without any creative work fall within the scope of protection of the present disclosure.

The terminal device according to the present disclosure may also be referred to as an access terminal, a subscriber unit, a subscriber station, a mobile station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device and a computing device with a function of wireless communications, or other processing devices connected to a wireless modem, an in-vehicle device, a wearable device, and a terminal device in future 5G networks.

The access network device may be used to perform communication with the mobile device. The access network device may be a Base Transceiver Station (BTS) in Global System of Mobile communication (GSM) or Code Division Multiple Access (CDMA). The base station may also be a NodeB (NB, base station) in Wideband Code Division Multiple Access (WCDMA), or an eNB or an Evolutional Node B (eNodeB, an evolved base station) in Long Term Evolution (LTE), or a relay station or access point, or an in-vehicle device, a wearable device, and an access network device in a future 5G network.

The core network device may be a Mobility Management Entity (MME), or a Serving Gateway (S-GW) or a PDN Gateway (P-GW), which is not limited by the present disclosure. For convenience of description, the following embodiments will be described by taking the MME as an example, but the present disclosure is not limited thereto.

In a communication system, "context establishment" means the establishment of a context session, mainly includes the establishment of a connection between functional entities for information transmission. For example, when a Radio Resource Control (RRC) protocol is established between two functional entities, i.e., a user equipment (UE) and an access network device, a communication link between the two functional entities is context, or a connection link between the UE and a gateway is the context. When a UE is in an attached state (a non-idle state), its context includes a capability of a mobile phone network, an identity (ID) of the access network device, authentication information, a negotiated security algorithm, a generated key, created connection information, bearer information, and so on. The information should be saved before the UE is detached. Otherwise, a system cannot perform processing when a user performs a behavior such as a service request or attach. Since the system cannot find the context for the UE, it cannot learn about a network protocol of the UE, the gateway connected to the UE, the bearers created by the UE, and the message from the UE may not be decrypted.

FIG. 1 illustrates a schematic diagram of an application scenario according to the present disclosure. As illustrated as FIG. 1, the terminal device 1 is moved from the cell covered by the access network device 1 to the cell covered by the access network device 2, and performs handover from the access network 1 to the access network 2.

Figure 2:
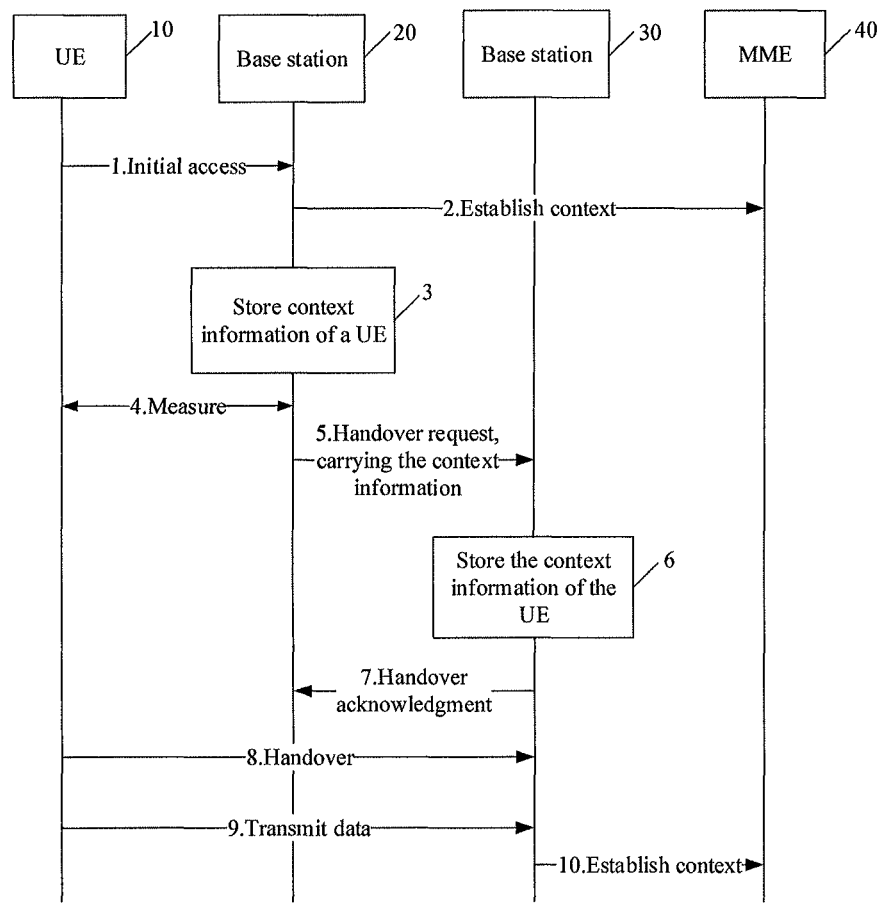
FIG. 2 illustrates a schematic diagram of a communication method in the related art.

FIG. 2 illustrates a schematic diagram of a communication method in the prior art. A process of establishing a connection and a handover flow of a UE are illustrated in FIG. 2. The detailed acts are described below.

1. A location of the UE 10 falls within coverage of the base station 20. Hence, the UE 10 initiates an initial connection access to establish a connection with the base station 20.

2. The base station 20 establishes context for the UE 10, for example, the base station 20 establishes a network connection with the MME 40, and the like.

3. The base station 20 acquires the context information for the UE 10 through the network connection with the MME 40 and stores the context information for the UE 10.

4. The base station 20 transmits a measurement message to the UE 10 to instruct the UE to detect required measurement parameters. The UE detects the measurement parameters based on the measurement message, and reports a measurement report to the base station 20. The base station 20 determines, based on the measurement report, that the UE 10 is moved and the location 2 of the UE 10 after being moved falls within coverage of the base station 30.

5. The base station 20 transmits a base station handover request message to the base station 30, and the base station handover request message carries the context information for the UE 10.

6. The base station 30 stores the context information for the UE 10.

7. The base station 30 returns a handover acknowledgement to the base station 20.

8. The UE 10 performs handover from the base station 20 to the base station 30.

9. The UE 10 transmits data to the base station 30 after performing handover from the base station 20 to the base station 30.

10. When there is data to be transmitted, the base station 30 establishes a network connection with the UE 10 and context of the UE based on the context information for the UE 10.

Therefore, in the prior art, after the UE is moved, firstly, a base station handover is performed. The base station establishes a network connection and context based on the context information for the UE when there is data to be transmitted. Hence, the UE has a long delay in terms of data transmission after being moved.

Figure 3:
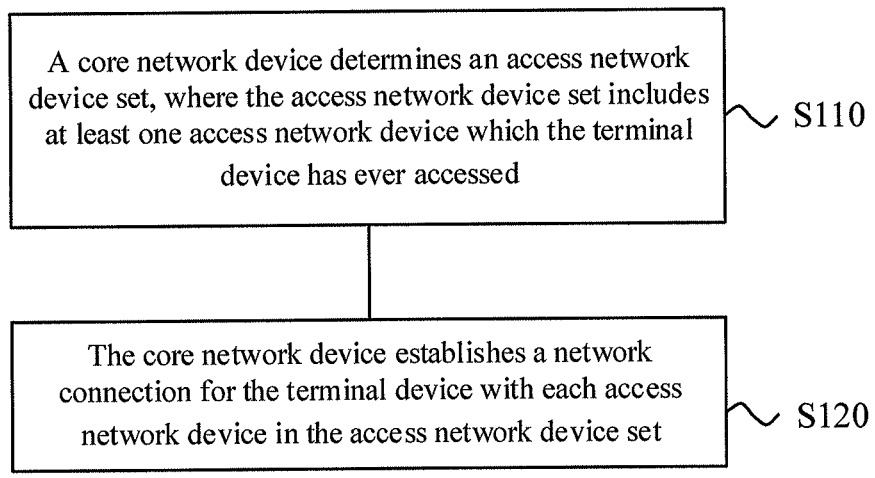
FIG. 3 illustrates a schematic diagram of a communication method according to an embodiment of the present disclosure.

FIG. 3 illustrates a schematic diagram of a communication method 100 according to an embodiment of the present disclosure. The meanings of various terms in this embodiment according to the present disclosure are the same as those of the foregoing embodiments. The communication method 200 is executed by a core network device. The communication method 100 includes the following acts.

At block S110, a core network device determines an access network device set. The access network device set includes at least one access network device which the terminal device has ever accessed.

At block S120, the core network device establishes a network connection for the terminal device with each access network device in the access network device set.

Specifically, the core network device determines the access network device set including at least one access network device which the terminal device has ever accessed. The core network device establishes a network connection for the terminal device with each access network device in the access network device set in advance, so that the terminal device can be moved seamlessly within coverage of all the access network devices in a virtual access network device set, thereby reducing the communication delay.

It should be understood that, the core network device may release the network connection established for the terminal device with the virtual access network device set when the terminal device initiates a detach request or a service release request.

Therefore, with the communication method according to the embodiment of the present disclosure, a core network device determines an access network device set including at least one access network device, and establishes a network connection for the terminal device with each access network device in the access network device set. Accordingly, each access network device in the access network device set establishes the network connection with the terminal device in advance, so that the terminal device can be moved seamlessly within coverage of the at least one access network device, thereby reducing the communication delay.

Alternatively, in an embodiment of the present disclosure, the operation of establishing a network connection by the core network device with each access network device in the set access network device set may include an operation performed by the core network device of transmitting a network connection request message to each access network device in the access network device set. The network connection request message is used to establish a network connection with the terminal device.

The core network device may transmit the network connection request message to each access network device in the access network device set, so that each access network device in the access network device set establishes the network connection with the terminal device based the network connection request message. The present disclosure is not limited thereto. Accordingly, each access network device in the access network device set establishes the network connection with the terminal device in advance, so that the terminal device can be moved seamlessly within coverage of the at least one access network device, thereby reducing the communication delay.

It should be understood that, establishment of the network connection may be implemented by the core network device through initiating the network connection request message, or may be implemented by the access network device through initiating the request, or the like, which is not limited by the present disclosure.

Alternatively, in an embodiment of the present disclosure, the communication method may further include that, the core network device transmits context information to each access network device so that the terminal device communicates with a network through the context information.

The core network device transmits the context information to each access network device in the access network device set. The context information is configured and generated for the terminal device by the access network device which the terminal device currently accesses when the terminal device initiates a service connection. The context information may be transmitted to the core network in the network connection request message or by other means, which is not limited in the present disclosure. Each access network device in the access network device set can receive and store the context information. When the terminal device accesses a first access network device (that is, any access network device in the access network device set) after being moved, the terminal device can communicate with a network through the context information stored by the first access network device. The network may be an access network or other network, which is not limited in the present disclosure. Accordingly, the terminal device can be moved seamlessly within coverage of at least one access network device, thereby reducing the communication delay.

Alternatively, in an embodiment of the present disclosure, the determining the access network device set by the core network device may include the following operations.

The core network device acquires access history information or subscription information of the terminal device.

The core network device determines the access network device set based on the access history information or the subscription information.

Specifically, the core network device acquires the access history information or the subscription information of the terminal device, and determines, based on the access history information or the subscription information, which access network device(s) is/are included in the access network device set. That is, the core network device determines, based on the access history information or the subscription information, which access network device(s) the terminal device is accustomed to access.

It should be understood that, the core network device may determine the access network device set which the terminal device has ever accessed, based on the access history information or the subscription information of the terminal device, or other information. Or, the access network device set may be determined and notified to the core network device through indication information by another device, so that the core network device may determine the access network device set which the terminal device has ever accessed. This is not limited in the present disclosure.

Alternatively, in an embodiment of the present disclosure, the operation performed by the core network device of acquiring the access history information or the subscription information of the terminal device may include that, the core network device receives the access history information or the subscription information from the terminal device.

Specifically, the core network device may directly receive the access history information or the subscription information from the terminal device. For example, when the terminal device transmits an NAS signaling request message to the core network device, the signaling request message carries the access history information. Alternatively, the core network device receives the subscription information carried by various messages from the terminal device in an attach process, an area update process managed by the core network device, or a process of initiating a service request to establish NAS signaling connection. The present disclosure is not limited thereto.

Alternatively, in an embodiment according to the present disclosure, he operation performed by the core network device of acquiring the access history information of the terminal device may include that, the core network device receives the access history information from the access network device to which the terminal device accesses Specifically, the core network device may also receive the access history information forwarded by the access network device which the terminal device currently accesses. For example, when a signaling connection is to be established between the terminal device and the access network device, the terminal device transmits the access history information to the access network device which the terminal device currently accesses, and the access network device reports the access history information to the core network device when initiating a service connection establishment request to the core network device. The present disclosure is not limited thereto.

Alternatively, in an embodiment according to the present disclosure, the operation performed by the core network device of acquiring the access history information of the terminal device may include that, the core network device acquires location information of the terminal device, and determines the access history information based on a network topology diagram and the location information of the terminal device.

Specifically, the topology diagram may be a structure diagram of a network including network node devices and communication media. A network topology defines how various computers, printers, network devices, and other devices are connected. In other words, the network topology describes a layout of cables and the network devices and paths for data transmission.

The core network device may acquire location information of the terminal device at each time point or in each time period from a positioning server, and determine the access history information of the terminal device based on the location information and the network topology diagram of the access network.

Alternatively, the access history information may include network statistic information of the access network device. The operation performed by the core network device of determining the access network device set based on the access history information may include that, the core network device determines the access network device set based on the network statistics information.

Specifically, the core network device determines, based on the access history information of the terminal device, which access network devices are access network devices on which the terminal device is accustomed to camp. That is, the core network device can determine which access network device the terminal device may access next, and establish a network connection with the terminal device in advance, thereby reducing the communication delay.

Alternatively, in an embodiment according to the present disclosure, the network statistics information may include access network information.

Specifically, the access history information may be an ID(s) of an access network device(s) on which the terminal device has ever camped, or may be other information for indicating the access network device(s) which the terminal device has ever accessed. The present disclosure is not limited thereto. The core network device determines the access network device set 1 based on the ID(s) included in the access history information. Accordingly, the core network device transmits a network connection request and context information to each access network device on which the terminal device has ever camped, so that each access network device in the access network device set 1 can establish the network connection with the terminal device in advance, and the terminal device can perform communication with the core network device through the context information.

Alternatively, in an embodiment according to the present disclosure, the network statistics information may further include at least one of duration information or service type information.

Specifically, the network statistics information further includes the at least one of the duration information or the service type information. That is, the access history information may include information of a duration for which the terminal device has ever camped on a certain access network device. Accordingly, the core network device can determine the priority of the access network device based on the information of the duration for which the terminal device camps on each access network device. For example, a time threshold may be set, and the access network device on which the terminal device camps for a duration exceeding the time threshold is determined to be an access network device in the access network device set. Accordingly, at least one access network device on which the terminal device has ever camped for a long time (that is, the terminal device is accustomed to camp) is determined to be the access network device set 2. Compared with a method for determining the access network device set only based on the ID(s), according to the embodiment of the present disclosure, the number of access network devices in the access network device set can be further reduced, avoiding the access network device(s) on which the terminal device camps for a relatively small number of times from establishing the network connection with the terminal device, and thus reducing the resource waste.

It should be understood that the access network device set 2 herein is a subset of the access network device set 1, that is, the access network devices in the access network device set 2 are selected from the access network device set 1.

Or, the access history information may further include a type of a service initiated by the terminal device camping on a certain access network device. Accordingly, the core network device can determine the priority of the access network device based on the type of the service currently initiated by the terminal device. Accordingly, the core network device determines at least one access network device on which the terminal device is accustomed to camp when initiating the corresponding type of the service to be the access network device set 3. According to the embodiment of the present disclosure, the number of access network devices in the access network device set can be reduced, avoiding the access network device(s) on which the terminal device camps for a relatively small number of times from establishing the network connection with the terminal device, and thus reducing the resource waste.

It should be understood that the access network device set 3 here is a subset of the access network device set 1, that is, the access network devices in the access network device set 3 are selected from the access network device set 1.

It should be noted that, the access network device sets determined by the core network device based on different types of services may be same or different, which is not limited in this embodiment of the present disclosure.

Alternatively, the access history information may further include a duration for which the terminal device has ever camped on a certain access network device for performing a certain service. Accordingly, the core network device can determine the priority of the access network device based on a type of the service currently initiated by the terminal device and the duration of the type of the service. Accordingly, at least one access network device on which the terminal device has ever camped for a long time when the terminal device initiates the corresponding service type, is determined to be the access network device set 4. According to the embodiment of the present disclosure, the number of access network devices in the access network device set can be further reduced, avoiding the access network device(s) on which the terminal device camps for a relatively small number of times from establishing the network connection with the terminal device, and thus reducing the resource waste.

It should be understood that the access network device set 4 here is a subset of the access network device set 2 or the access network device set 3.

Alternatively, in an embodiment according to the present disclosure, the subscription information may include location area information.

The operation performed by the core network device of determining the access network device set based on the subscription information may include that, the core network device determines the access network device set based on the location area information.

Specifically, the subscription information includes area information related to the UE. Since a geographical location of the UE corresponds to coverage of the access network device, the core network device can determine, based on the location area information, the access network device on which the UE has ever camped, and determine at least one access network device on which the UE has ever camped to be the access network device set 5.

Alternatively, in an embodiment according to the present disclosure, the subscription information may further include at least one of service type information or time information.

The operation performed by the core network device of determining the access network device set based on the location area information may include that, the core network device determines the access network device set based on the location area information and at least one of the service type information or the time information.

Specifically, the subscription information may further include a mapping relationship between each service of a UE and an area, that is, a mapping relationship between different service types and areas. The subscription information may further include a mapping relationship between the terminal device and the area at different time points or in different time periods. The core network device determines, based on the current time point or the current time period, the access network device on which the terminal device is accustomed to camp, and sets the priority of the access network device, so as to determine at least one access network device with a higher priority to be the access network device set 6.

It should be understood that the access network device set 6 here is a subset of the access network device set 5, that is, the access network devices in the access network device set 6 are selected from the access network device set 5.

Or, the subscription information may further include a mapping relationship between various services and the area of the terminal device at different time points or in different time periods, and the like. Specifically, the core network device determines the priority of the access network device on which the terminal device has ever camped based on the current time point or the current time period and the current service type. Thereby, at least one access network device with a higher priority is determined to be the access network device set 7.

It should be understood that the access network device set 7 here is a subset of the access network device set 6, that is, the access network devices in the access network device set 7 are selected from the access network device set 6.

It should be understood that the specific indication manners of the above-described information may be seen from the foregoing embodiments, and are not described herein for brevity.

Therefore, with the communication method according to the embodiment of the present disclosure, the core network device determines an access network device set including at least one access network device, and transmits a network connection request message to each access network device in the access network device set, so that each access network device in the access network device set establishes a network connection with the terminal device based on the network connection request message. Accordingly, each access network device in the access network device set can establish the network connection with the terminal device in advance, so that the terminal device can be moved seamlessly within coverage of the at least one access network device, thereby reducing the communication delay.

It should be understood that, in various embodiments of the present disclosure, the sequence numbers of the above-described process do not mean an execution order. The execution order of each process should be determined based on a function and an inherent logic of the process, and should not limit implementations of the embodiments of the present disclosure.

The communication method 100 according to an embodiment of the present disclosure is described in detail from the view of the core network device. The communication method according to an embodiment of the present disclosure will be described below from the view of an access network device.

Figure 4:
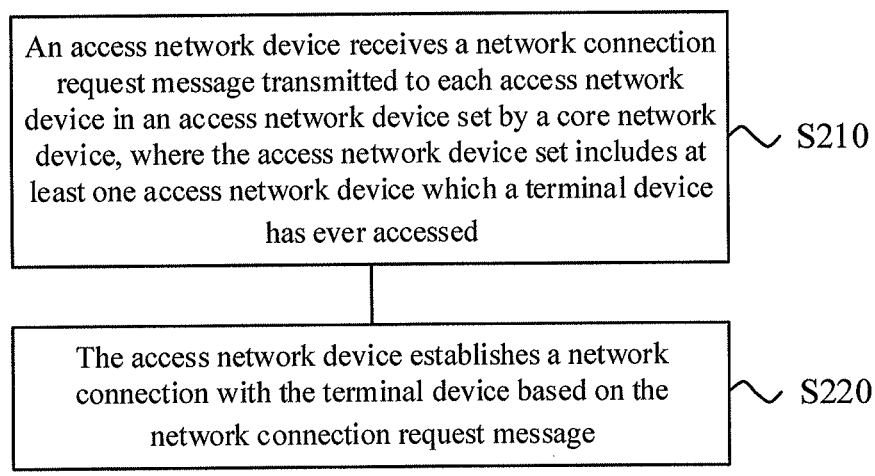
FIG. 4 illustrates a schematic diagram of a communication method according to an embodiment of the present disclosure.

FIG. 4 illustrates a schematic diagram of a communication method 200 according to an embodiment of the present disclosure. The meanings of various terms in the embodiment according to the present disclosure are the same as those of the foregoing embodiments. The communication method 200 is executed by an access network device. The communication method 200 includes the following operations.

At block S210, an access network device receives a network connection request message transmitted to each access network device in an access network device set by a core network device and configured for a terminal device. The access network device set includes at least one access network device which a terminal device has ever accessed.

At block S220, the access network device establishes a network connection with the terminal device based on the network connection request message.

Specifically, the access network device receives the network connection request message from the core network device, and the core network device transmits the network connection request message of the terminal device to each access network device in the access network device set. The access network device establishes a network connection with the terminal device based on the network connection request message in advance.

It should be understood that, the access network device establishes the network connection based on the network connection request message. Specifically, the network connection may be a connection on at least one of a control plane or a user plane, or the like, which is not limited in the present disclosure.

It should be understood that each access network device may establish one connection, or may establish multiple connections at the same time, which is not limited in the present disclosure.

Alternatively, the communication method further includes that, the access network device receives context information, so that the terminal device communicates with a network through the context information.

The context information is configured and generated for the terminal device by the access network device which the terminal device currently accesses when the terminal device initiates a service connection. The context information may be transmitted to the core network device in the network connection request message, or may be transmitted to the core network device in other ways. Then the context information is transmitted to each access network device in an access network device set by the core network device. Or, the context information may be directly transmitted to an access network device in the access network device set after the access network device which the terminal device currently accesses learns about the access network device set. The present disclosure is not limited thereto. Each access network device in the access network device set can receive and store the context information. After the terminal device is moved and accesses a first access network device (that is, any one of access network devices in the access network device set), the terminal device can communicate with a network through the context information stored in the first access network device. The network may be an access network or other network, which is not limited in the present disclosure. Accordingly, the terminal device can be moved seamlessly within the coverage of the at least one access network device, thereby reducing the communication delay.

Therefore, with the communication method according to the embodiment of the present disclosure, the access network device receives the network connection request message transmitted by the core network device and configured for the terminal device, and establishes a network connection with the UE based on the network connection request message. Accordingly, each access network device in the access network device set can establish a network connection with the UE in advance, so that the terminal device can be moved seamlessly within the coverage of the at least one access network device, thereby reducing the communication delay.

It should be understood that, the specific indication manners of the above-described information may be seen from the foregoing embodiments, and are not described herein for brevity.

It should further be understood that, in various embodiments of the present disclosure, the sequence numbers of the above-described process do not mean an execution order. The execution order of the processes should be determined based on a function and an inherent logic of the process, and should not limit the implementations of the embodiments according to the present disclosure.

The communication method 200 according to the embodiment of the present disclosure is described in detail from the view of the access network device. A communication method according to an embodiment of the present disclosure will be described below from the view of a terminal device.

Figure 5:
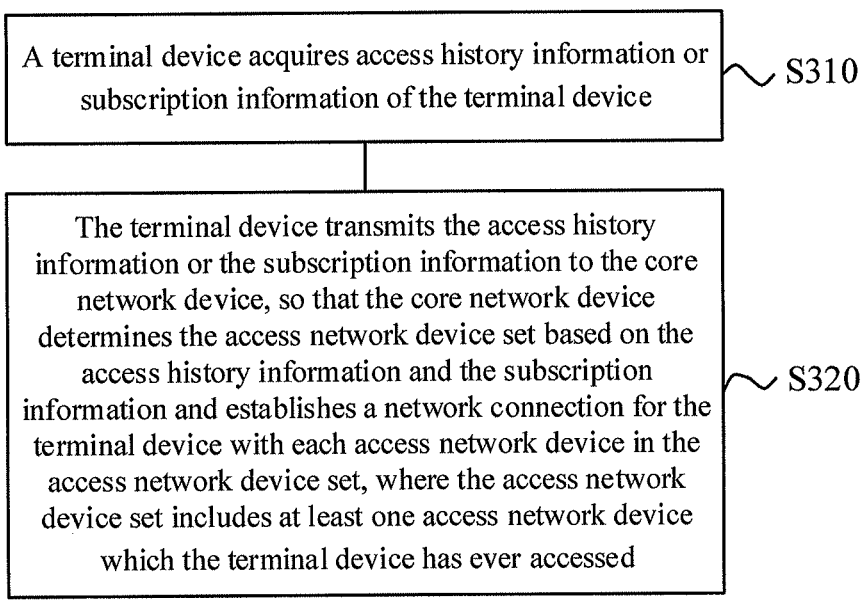
FIG. 5 illustrates a schematic diagram of a communication method according to an embodiment of the present disclosure.

FIG. 5 illustrates a schematic diagram of a communication method 300 according to an embodiment of the present disclosure. The communication method 300 is executed by a terminal device. The communication method 300 includes the following operations.

At block S310, the terminal device acquires access history information or subscription information of the terminal device.

At block S320, the terminal device transmits the access history information or the subscription information to the core network device, so that the core network device determines the access network device set based on the access history information or the subscription information, and establishes a network connection for the terminal device with each access network device in the access network device set.

Specifically, the terminal device acquires the access history information or the subscription information. The access history information or the subscription information is used to indicate the access network device set including the at least one access network device on which the terminal device has ever camped. The terminal device transmits the access history information or the subscription information to the core network device, so that the core network device determines the access network device set based on the access history information or the subscription information, and establishes the network connection for the terminal device with each access network in the access network device set. Accordingly, each access network device in the access network devices set can establish the network connection with the terminal device in advance.

Therefore, with the communication method according to the embodiment of the present disclosure, the terminal device transmits the access history information or the subscription information of the terminal device to the core network device, so that the core network device determines an access network device set including at least one access network device based on the access history information or the subscription information of the terminal device, and establishes a network connection for the terminal device with each access network device in the access network device set. Accordingly, each access network device in the access network device set can establish the network connection with the terminal device in advance, so that the terminal device can be moved seamlessly within coverage of the at least one access network device, thereby reducing the communication delay.

Alternatively, in an embodiment according to the present disclosure, the communication method may further include that, the terminal device performs network communication through the context information received through a first access network device in the access network device set.

The network connection request message carries context information for the terminal device. The context information is configured and generated for the terminal device by the access network device which the terminal currently accesses when the terminal device initiates a service connection, and is transmitted to the core network. Or, the context information may be transmitted to the core network device in other ways, which is not limited in the present disclosure. Each access network device in the access network device set can receive and store the context information. After the terminal device is moved and accesses a first access network device (that is, any one of access network devices in the access network device set), the terminal device can communicate with a network through the context information stored by the first access network device. The network may be an access network or other network, which is not limited in the present disclosure. Accordingly, the terminal device can be moved seamlessly within the coverage of the at least one access network device, thereby reducing the communication delay.

Alternatively, the operation performed by the terminal device of transmitting the access history information or the subscription information to the core network device may include that, the terminal device transmits the access history information or the subscription information to the core network device via an access network device which the terminal device accesses.

Specifically, the terminal device may transmit the access history information to the access network device which the terminal device currently accesses, and the access network device may forward the access history information to the core network device. For example, a signaling connection is established between the terminal device and the access network device. Alternatively, the terminal device transmits the access history information to the access network device which the terminal device currently accesses, and reports the access history information to the core network device when the access network device initiates a service connection establishment request to the core network device. The present disclosure is not limited thereto.

Alternatively, in an embodiment of the present disclosure, the access history information may include network statistics information of the access network device.

Specifically, the access history information may include network statistics information of the access network device. The network statistics information may be an ID of an access network device on which the terminal device has ever camped, or may be other information for indicating the access network device which the terminal device has ever accessed. The present disclosure is not limited thereto. The terminal device transmits the ID of the access network device, so that the core network device determines the access network device set based on the ID included in the access history information. Accordingly, the core network device transmits context information to each access network device on which the terminal device has ever camped, so that each access network device in the access network device set can establish the network connection and context for the terminal device in advance.

Alternatively, in an embodiment of the present disclosure, the operation performed by the terminal device of transmitting the access history information to the core network device may include that, the terminal device transmits an NAS signaling request message to the core network device. The NAS signaling request message carries the access history information.

Specifically, the terminal device may directly transmit the access history information to the core network device. For example, when the terminal device is to transmit the NAS signaling request message to the core network device, the terminal device carries the access history information in the NAS signaling request message.

Alternatively, in an embodiment of the present disclosure, the access history information may further include at least one of duration information or service type information.

Specifically, the access history information includes an ID(s) of an access network device(s) on which the terminal device has ever camped, and further includes at least one of duration information or service type information. That is, the access history information includes information of a duration for which the terminal device has ever camped on a certain access network device. Or, the access history information may further include types of services performed by the terminal device when the terminal device has ever camped on different access network devices. Or, the access history information may further include a duration for which the terminal device performs a certain service when the terminal device has ever camped on a certain access network device. Or, the access history information may be durations for which the terminal device performs all services when the terminal device has ever camped on a certain access network device. The present disclosure is not limited thereto.

It should be understood that the duration information may be configured based on a network and used to indicate a specific time point or a specific time period, such as a specific time value (hour, minute and second), or a recent time period. Or, the duration information may be a ratio of the duration for which the terminal device camps on the access network device to a sum of durations of all the camped access network devices.

Alternatively, in an embodiment of the present disclosure, the subscription information may include location area information.

Specifically, the subscription information includes area information related to the terminal device. It can be determined of which access network device the terminal device is under coverage based on a geographic location of the terminal device, so that the core network device can determine, based on the location area information, the access network device on which the terminal device has ever camped.

Alternatively, in an embodiment of the present disclosure, the operation performed by the terminal device of transmitting the subscription information to the core network device may include that, the terminal device transmits the subscription information to the core network device in an area update request message, an NAS signaling request message or an attach request message.

Specifically, the terminal device reports the subscription information to the core network device through various messages transmitted to the core network device in an attach process, an area update process managed by the core network device, or a process of initiating a service request to establish an NAS signaling connection. The present disclosure is not limited thereto.

Alternatively, in an embodiment of the present disclosure, the subscription information may further include at least one of service type information or time information.

The subscription information may further include a mapping relationship between each service of a terminal device and an area, that is, a mapping relationship between different service types and areas. The subscription information may further include a mapping relationship between the terminal device at different time points or in different time periods and the areas. The subscription information may further include a mapping relationship between services of the terminal device at different time points or in different time periods and areas, and the like. The present disclosure is not limited thereto.

Therefore, with the communication method according to the embodiment of the present disclosure, the terminal device transmits the access history information or the subscription information of the terminal device to the core network device, so that the core network device determines an access network device set including at least one access network device based on the access history information or the subscription information, and transmits a network connection request message configured for the terminal device to each access network device in the access network device set. Each access network device in the access network device set establishes a network connection with the terminal device based on the network connection request message. Accordingly, each access network device in the access network device set establishes a network connection with the terminal device in advance, so that the terminal device can be moved seamless within coverage of the at least one access network device, thereby reducing the communication delay.

It should be understood that, the specific indication manners of the above-described information may be seen from the foregoing embodiments, and are not described herein for brevity.

It should further be understood that, in various embodiments of the present disclosure, the sequence numbers of the above-described process do not mean an execution sequence. The execution order of the process should be determined based on a function and an inherent logic of the process, and should not limit the implementation of the embodiments according to the present disclosure.

The communication method 300 according to the embodiment of the present disclosure is described in detail from the view of the terminal device. A flowchart of a communication method according to an embodiment of the present disclosure is described below.

Figure 6:
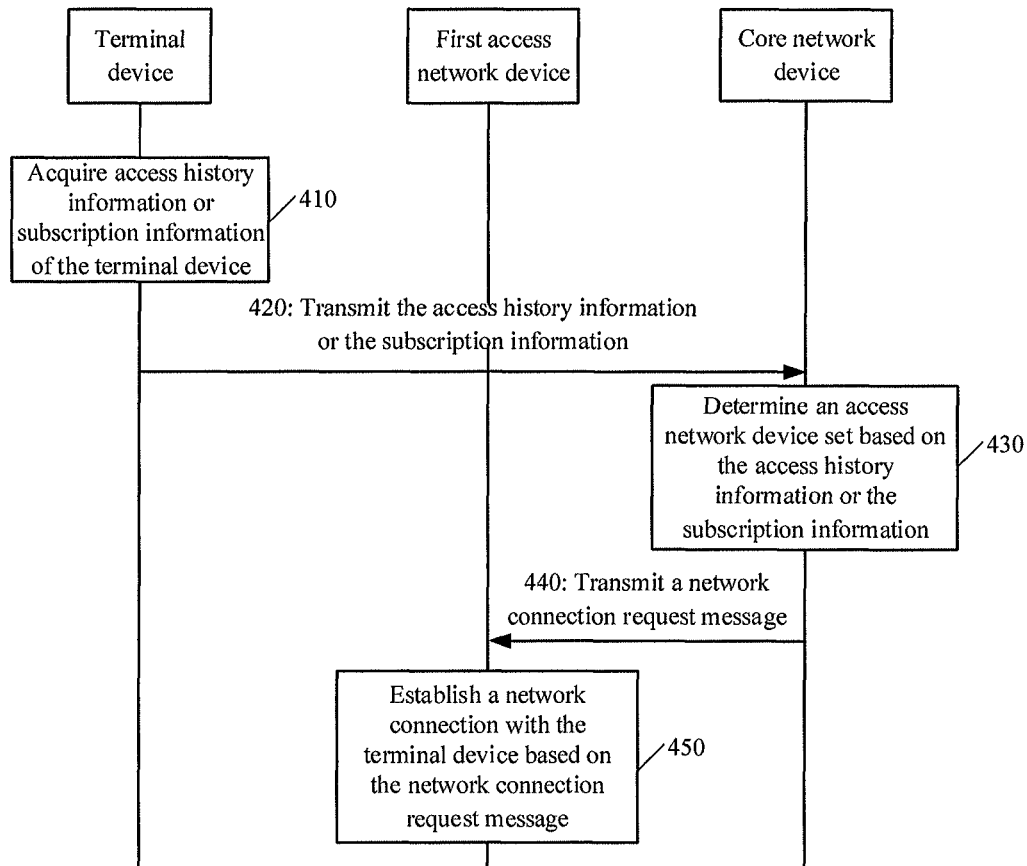
FIG. 6 illustrates a schematic flowchart of a communication method according to an embodiment of the present disclosure.

FIG. 6 illustrates an interaction flowchart of a communication method according to one embodiment of the present disclosure. The meanings of various terms in the embodiments according to the present disclosure are the same as those of the foregoing embodiments.

It should be noted that this is only to help those skilled in the art to better understand the embodiments according to the present application, and not to limit the scope of the embodiments according to the present disclosure.

At block 410, a terminal device acquires access history information or subscription information of the terminal device.

At block 420, the terminal device transmits the access history information or the subscription information to a core network device.

The terminal device may directly transmit the access history information to the core network device. For example, when the terminal device may carry the access history information in an NAS signaling request message and transmit the NAS signaling request message to the core network device. Or, the terminal device may transmit the access history information to the access network device which the terminal device currently accesses, and the access network device may forward the access history information to the core network device.

At block 430, the core network device determines an access network device set based on the access history information or the subscription information.

The core network device receives the subscription information or the access history information, and determines at least one access network device on which the terminal device often camps based on the subscription information or the access history information, and determines the at least one access network device to be a virtual access network device set.

The core network device may determine different access network device sets based on different types of information (an identification ID and the duration information and/or the type service information of the access network device) included in the access history information.

At block 440, the core network device transmits a network connection request message to each of the at least one access network device.

The core network device determines the access network device set (that is, at least one access network device) of the terminal device, and transmits a network connection request message to each of the at least one access network device. The network connection request message carries context information for the terminal device. The context information is configured and generated for the terminal device by the access network device which the terminal device currently accesses when the terminal device initiates a service connection, and the context information is transmitted to the core network. Each access network device in the access network device set all can receive and store the context information.

At block 450, the access network device establishes a network connection with the terminal device based on the network connection request message.

Each of the at least one access network device receives the network connection request message, and establishes a network connection with the terminal device based on the network connection request message. Or, the core network device may directly establish a network connection with each access network device in the access network device set, which is not limited in the present disclosure. Accordingly, each access network device in the access network device set can establish the network connection with the terminal device in advance, so that the terminal device can be moved seamlessly within the coverage of the at least one access network device, thereby reducing the communication delay.

After the terminal device is moved and accesses a first access network device (that is, any one of access network devices in the access network device set), the terminal device can communicate with the access network through the context information stored by the first access network device. Accordingly, the terminal device can be moved seamlessly within the coverage of the at least one access network device, thereby reducing the communication delay.

For example, when the terminal device camps on the cell 2 of an access network device (AN1) and initiates a service connection request, the AN1 establishes a connection with the core network device (CN) and configures context information for the terminal device. The AN1 also transmits the configured context information to the CN. The CN learns that the AN2 is also the access network device on which the terminal device often camps based on the saved access history information of the terminal device (that is, the AN2 belongs to the access network device set). Therefore, the CN establishes a network connection with the AN2, and transmits the context information for the terminal device to the AN2, so that the AN2 communicates with a network through the context information. Accordingly, the terminal device can be moved seamlessly between the cell covered by the AN1 and the cell covered by the AN2, thereby reducing the communication delay.

It should be understood that, the specific indication manners of the above-described information may be seen from the foregoing embodiments, and are not described herein for brevity.

Therefore, with the communication method according to the embodiment of the present disclosure, the terminal device transmits the access history information or the subscription information of the terminal device to the core network device, so that the core network device determines the access network device set including at least one access network based on the access history information or the subscription information, and transmits a network connection request message to each access network device in the access network device set. Each access network device in the access network device set establishes a network connection with the terminal device based on the network connection request message. Accordingly, each access network device in the access network device set can establish the network connection with the terminal device in advance, so that the terminal device can be moved seamlessly within the coverage of the at least one access network device, thereby reducing the communication delay.

It should be understood that, in various embodiments of the present disclosure, the sequence numbers of the above-described process do not mean an execution order. The execution order of each process should be determined based on a function and an inherent logic of the process, and should not limit implementations of the embodiments of the present disclosure.

The communication method according to an embodiment of the present disclosure is described in detail above. A terminal device according to an embodiment of the present disclosure will be described below.

Figure 7:
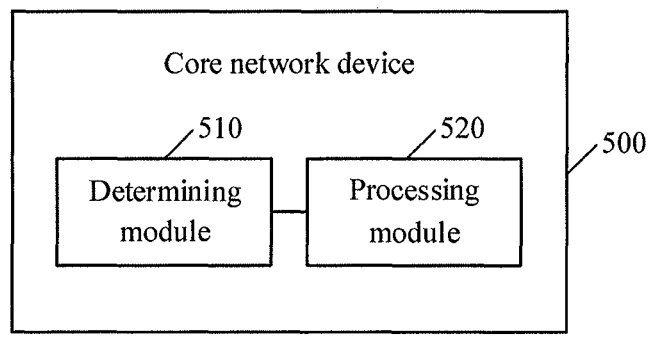
FIG. 7 illustrates a schematic block diagram of a core network device according to an embodiment of the present disclosure.

FIG. 7 illustrates a schematic block diagram of a core network device 500 according to an embodiment of the present disclosure. As illustrated in FIG. 7, the core network device 500 includes a determining module 510 and a processing module 520.

The determining module 510 is configured to determine an access network device set. The access network device set includes at least one access network device which the terminal device has ever accessed.

The processing module 520 is configured to establish a network connection for the terminal device with the access network device in the access network device set determined by the determining module 510.

Therefore, the core network device according to the embodiment of the present disclosure determines an access network device set including at least one access network device, and establishes a network connection for the terminal device with each access network device in the access network device set. Accordingly, each access network device in the access network device set can establish the network connection with the terminal device in advance, so that the terminal device can be moved seamlessly within the coverage of the at least one access network device, thereby reducing the communication delay.

Alternatively, the processing module 520 may be configured to transmit a network connection request message to each access network device in the access network device set, where the network connection request message is used to establish a network connection with the terminal device.

Alternatively, the core network device 500 may further include a transmitting module configured to transmit context information to each access network device, so that the terminal device communicates with a network through the context information.

Alternatively, in the embodiment according to the present disclosure, the determining module 510 may include an acquiring unit and a determining unit.

The acquiring unit is configured to acquire access history information or subscription information of the terminal device.

The determining unit is configured to determine the access network device set based on the access history information or the subscription information.

In an embodiment according to the present disclosure, the acquiring unit may be configured to receive the access history information or the subscription information from the terminal device.

Alternatively, in an embodiment according to the present disclosure, the acquiring unit may be configured to receive the access history information from the access network device which the terminal device accesses.

In an embodiment according to the present disclosure, the acquiring unit may be configured to acquire location information of the terminal device, and determine the access history information based on a network topology diagram and the location information of the terminal device.

In an embodiment according to the present disclosure, the access history information may include network statistic information of the access network device.

The determining unit may be configured to determine the access network device set based on the network statistics information.

In an embodiment according to the present disclosure, the network statistics information may include access network information.

Alternatively, in an embodiment according to the present disclosure, the network statistics information may further include at least one of duration information or service type information.

In an embodiment according to the present disclosure, the subscription information may include location area information.

The determining unit may be configured to determine the access network device set based on the location area information.

In an embodiment according to the present disclosure, the subscription information may further include at least one of service type information or time information.

The determining unit may be configured to determine the access network device set based on the location area information and at least one of the service type information or the time information.

Therefore, the core network device according to the embodiment of the present disclosure determines an access network device set including at least one access network device, and transmits a network connection request message to each access network device in the access network device set, so that each access network device in the access network device set can establish the network connection with the terminal device based on the network connection request message. Accordingly, each access network device in the access network device set can establish the network connection with the terminal device in advance, so that the terminal device can be moved seamlessly within the coverage of the at least one access network device, thereby reducing the communication delay.

The core network device 500 according to an embodiment of the present disclosure may correspond to the core network device according to the embodiments of the present disclosure, and the above-described and other operations and/or functions of the modules in the core network device 500 are used to respectively implement corresponding processes of the foregoing methods, and are not described herein for brevity.

Figure 8:
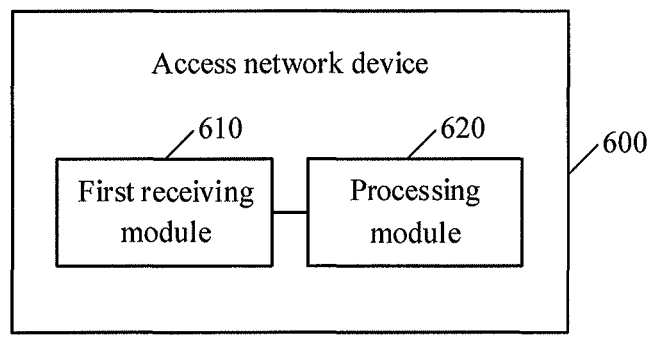
FIG. 8 illustrates a schematic block diagram of an access network device according to an embodiment of the present disclosure.

FIG. 8 illustrates a schematic block diagram of an access network device 600 according to an embodiment of the present disclosure. As illustrated in FIG. 8, the access network device 600 includes a first receiving module and a processing module.

The first receiving module 610 is configured to receive a network connection request message transmitted to each access network device in an access network device set by a core network device. The access network device set includes at least one access network device which a terminal device has ever accessed.

The processing module 620 is configured to establish a network connection with the terminal device based on the network connection request message received through the first receiving module 610.

Therefore, the access network device according to the embodiment of the present disclosure receives the network connection request message transmitted by the core network device and configured for the terminal device, and establishes a network connection with the UE based on the network connection request message. Accordingly, each access network device in the access network device set can establish a network connection with the UE in advance, so that the terminal device can be moved seamlessly within the coverage of the at least one access network device, thereby reducing the communication delay.

Alternatively, the access network device 600 may further include a second receiving module configured to receive context information, to cause the terminal device to communicate with a network through the context information.

Therefore, the access network device according to the embodiment of the present disclosure receives the network connection request message transmitted by the core network device and configured for the terminal device is received, and establishes a network connection with the UE based on the network connection request message. Accordingly, each access network device in the access network device set can establish a network connection with the UE in advance, so that the terminal device can be moved seamlessly within the coverage of the at least one access network device, thereby reducing the communication delay.

The access network device 600 according to an embodiment of the present disclosure may correspond to the access network device according to the embodiments of the present disclosure, and the above-described and other operations and/or functions of the modules in the access network device 600 are used to respectively implement corresponding processes of the foregoing methods, and are not described herein for brevity.

Figure 9:
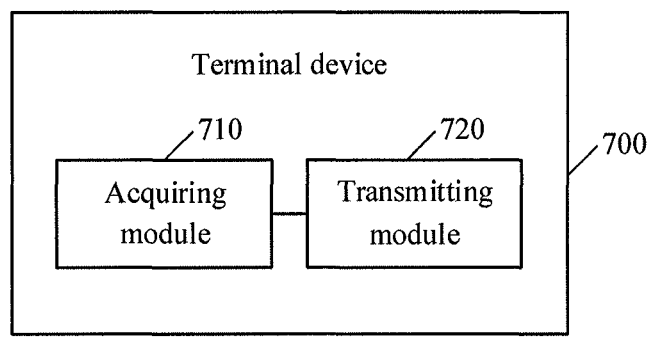
FIG. 9 illustrates a schematic block diagram of a terminal device according to an embodiment of the present disclosure.

FIG. 9 illustrates a schematic block diagram of a terminal device 700 according to an embodiment of the present disclosure. As illustrated in FIG. 9, the terminal device 700 includes an acquiring module 710 and a transmitting module 720.

The acquiring module 710 is configured to acquire access history information or subscription information of the terminal device.

The transmitting module 720 is configured to transmit the access history information or the subscription information to a core network device, to cause the core network device to determine an access network device set based on the access history information or the subscription information and establish a network connection for the terminal device with each access network device in the access network device set.

The access network device set includes at least one access network device which the terminal device has ever accessed.

Therefore, the terminal device according to the embodiment of the present disclosure, transmits the access history information or the subscription information of the terminal device to the core network device, so that the core network device determines an access network device set including at least one access network device based on the access history information or the subscription information, and establishes a network connection for the terminal device with each access network device in the access network device set. Accordingly, each access network device in the access network device set can establish the network connection with the terminal device in advance, so that the terminal device can be moved seamlessly within the coverage of the at least one access network device, thereby reducing the communication delay.

Alternatively, in an embodiment according to the present disclosure, the terminal device 700 may further include a processing module configured to communicate with a network through context information received through a first access network device in the access network device set.

Alternatively, in an embodiment of the present disclosure, the transmitting module 720 may be configured to transmit the access history information or the subscription information to the core network device via an access network device which the terminal device accesses.

In the embodiment of the present disclosure, the access history information may include network statistics information of the access network device.

Alternatively, in the embodiment of the present disclosure, the transmitting module 720 may be configured to an NAS layer signaling request message. The NAS layer signaling request message carries the access history information.

Alternatively, the network statistics information may include access network information.

In the embodiment of the present disclosure, the network statistics information may further include at least one of duration information or service type information.

Alternatively, in the embodiment of the present disclosure, the subscription information may include location area information.

Alternatively, in the embodiment of the present disclosure, the transmitting module 720 is configured to transmit the subscription information to the core network device in an area update request message, an NAS signaling request message or an attach request message.

Alternatively, in the embodiment of the present disclosure, the subscription information may further include at least one of service type information or time information.

Therefore, the terminal device according to the embodiment of the present disclosure transmits the access history information or the subscription information of the terminal device to the core network device, so that the core network device determines an access network device set including at least one access network device based on the access history information or the subscription information, and transmits a network connection request message configured for the terminal device to each access network device in the access network device set. Each access network device in the access network device set establishes a network connection with the terminal device based on the network connection request message. Accordingly, each access network device in the access network device set establishes a network connection with the terminal device in advance, so that the terminal device can move seamless within coverage of the at least one access network device, thereby reducing the communication delay.

The terminal device 700 according to an embodiment of the present disclosure may correspond to the terminal device according to the embodiments of the present disclosure, and the above-described and other operations and/or functions of the modules in the terminal device 700 are used to respectively implement corresponding processes of the foregoing methods, and are not described herein for brevity.

Figure 10:
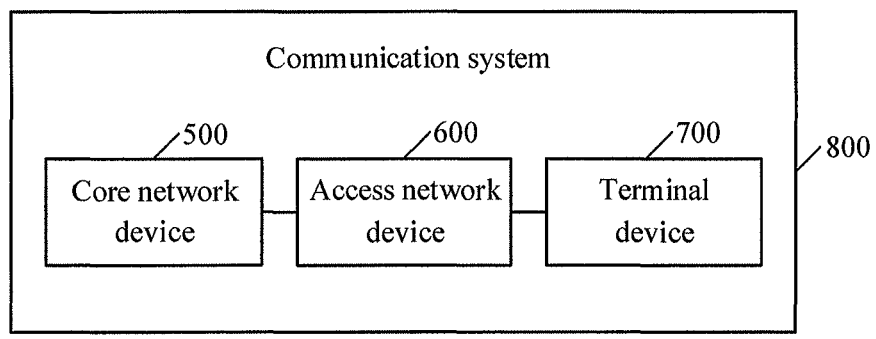
FIG. 10 illustrates a schematic block diagram of a communication system according to an embodiment of the present disclosure.

FIG. 10 illustrates a schematic block diagram of a communication system according to an embodiment of the present disclosure. The communication system 800 includes the core network device 500 according to the foregoing embodiment of the present disclosure, the access network device 600 according to the embodiment of the present disclosure, and the terminal device 700 according to the embodiment of the present disclosure.

Figure 11:
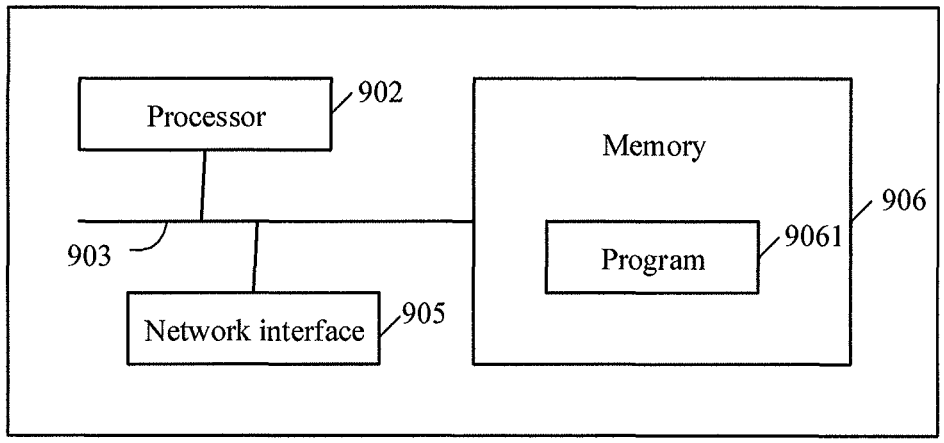
FIG. 11 illustrates a schematic structural diagram of a core network device according to an embodiment of the present disclosure.

FIG. 11 illustrates a structure of a core network device according to an embodiment of the present disclosure. The core network device includes at least one processor 902 (such as a general-purpose processor CPU with capabilities of computing and processing, a digital signal processor (DSP), an application specific integrated circuit (ASIC), a field programmable gate array (FPGA)). The processor manages and schedules the modules and components in an OBU device. The core network device further includes at least one network interface 905 or other communication interface, a memory 906, and at least one bus system 903. The components of the OBU are coupled via the bus system 903. The bus system 903 may include a data bus, a power bus, a control bus, a status signal bus and the like, but for clarity of description, various buses are labeled as a bus system 903 in FIG. 11.

The method disclosed in the above embodiments of the present disclosure may be applied to the processor 902 or used to execute an executable module stored in the memory 906, such as a computer program. The memory 906 may include a high-speed random access memory (RAM), and may also include a non-volatile memory. The memory may include a read-only memory and a random access memory, and provides the processor with required signaling or data, programs, and the like. A portion of the memory may further include a non-volatile random access memory (NVRAM). A communication connection with at least one other network element is achieved via at least one network interface 905 which may be wired or wireless.

In some embodiments, the memory 906 stores the program 9061, and the processor 902 executes the program 9061 to execute the following operations.

An access network device set is determined, where the access network device set includes at least one access network device which a terminal device has ever accessed.

A network connection for the terminal device established with each access network device in the access network device set.

Alternatively, the processor 902 may be configured to transmit a network connection request message to each access network device in the access network device set via the network interface 905, where the network connection request message is used to establish the network connection with the terminal device.

Alternatively, the processor 902 may be configured to receive context information via the network interface 905, to cause the terminal device to communicate with a network through the context information.

Alternatively, the processor 902 may be configured to acquire access history information or subscription information of the terminal device via the network interface 905, and determine the access network device set based on the access history information or the subscription information.

Alternatively, the processor 902 may be configured to receive the access history information or the subscription information from the terminal device via the network interface 905.

Alternatively, the processor 902 may be configured to receive the access history information from the access network device which the terminal device accesses via the network interface 905.

Alternatively, the processor 902 may be configured to acquire location information of the terminal device via the network interface 905, and determine the access history information based on a network topology diagram and the location information of the terminal device.

Alternatively, the access history information may include network statistic information of the access network device, and the processor 902 may be configured to determine the access network device set based on the network statistics information.

Alternatively, the network statistics information may include access network information.

Alternatively, the network statistics information may further include at least one of duration information or service type information.

Alternatively, the subscription information may include location area information, and the processor 902 may be configured to determine the access network device set based on the location area information.

Alternatively, the subscription information may further include at least one of service type information or time information; and the processor 902 may be configured to determine the access network device set based on the location area information and at least one of the service type information or the time information.

It can be seen from the above technical solution according to the embodiments of the present disclosure, an access network device set including at least one access network device is determined, and a network connection for the terminal device is established with each access network device in the access network device set. Accordingly, each access network device in the access network device set can establish the network connection with the terminal device in advance, so that the terminal device can be moved seamlessly within coverage of the at least one access network device, thereby reducing the communication delay.

Figure 12:
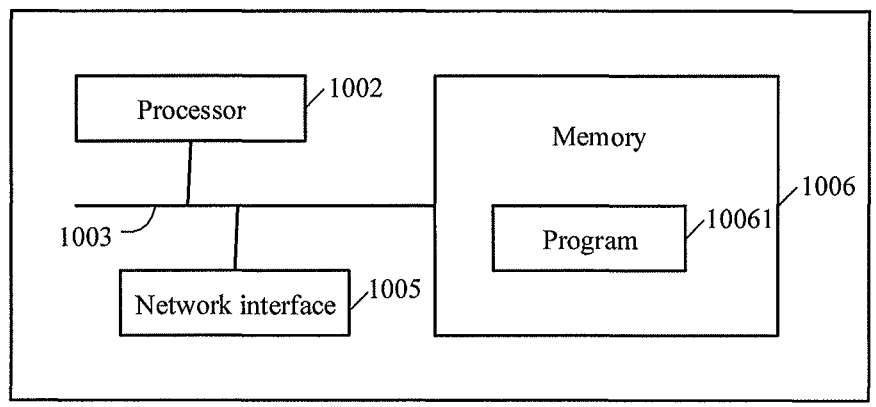
FIG. 12 illustrates a schematic structural diagram of an access network device according to an embodiment of the present disclosure.

FIG. 12 illustrates a structure of an access network device according to an embodiment of the present disclosure. The access network device includes at least one processor 1002 (such as a general-purpose processor CPU with capabilities of computing and processing, a digital signal processor (DSP), an application specific integrated circuit (ASIC), a field programmable gate array (FPGA)). The processor manages and schedules the modules and components in an OBU device. The access network device further includes at least one network interface 1005 or other communication interface, a memory 1006, and at least one bus system 1003. The components of the OBU are coupled via the bus system 1003. The bus system 1003 may include a data bus, a power bus, a control bus, a status signal bus and the like, but for clarity of description, various buses are labeled as a bus system 1003 in FIG. 12.

The method disclosed in the above embodiments of the present disclosure may be applied to the processor 1002 or used to execute an executable module stored in the memory 1006, such as a computer program. The memory 1006 may include a high-speed random access memory (RAM), or may include a non-volatile memory. The memory may include a read-only memory and a random access memory, and provides the processor with required signaling or data, programs, and the like. A portion of the memory may further include a non-volatile random access memory (NVRAM). A communication connection with at least one other network element is achieved via at least one network interface 1005 which may be wired or wireless.

In some embodiments, the memory 1006 stores the program 10061, and the processor 1002 executes the program 10061 to execute the following operations.

A network connection request message transmitted to each access network device in an access network device set from a core network device is received via the network interface 1005, where the access network device set includes at least one access network device which a terminal device has ever accessed.

A network connection with the terminal device is established based on the network connection request message.

Alternatively, the processor 1002 is further configured to receive context information, to cause the terminal device to communicate with a network through the context information.

It can be seen from the above technical solution according to the embodiments of the present disclosure, the network connection request message is received from the core network device, and a network connection for the terminal device is established with each access network device in the access network device set based on the network connection request message. Accordingly, each access network device in the access network device set can establish the network connection with the terminal device in advance, so that the terminal device can be moved seamlessly within coverage of the at least one access network device, thereby reducing the communication delay.

Figure 13:
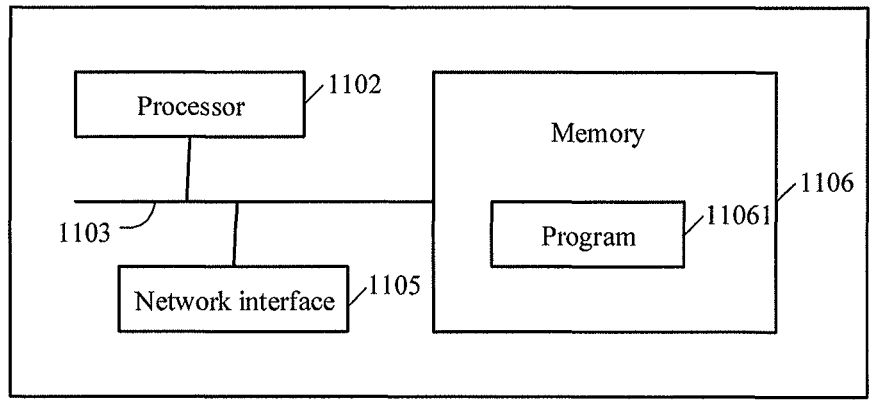
FIG. 13 illustrates a schematic structural diagram of a terminal device according to an embodiment of the present disclosure.

FIG. 13 illustrates a structure of a terminal device according to an embodiment of the present disclosure. The access network device includes at least one processor 1102 (such as a general-purpose processor CPU with capabilities of computing and processing, a digital signal processor (DSP), an application specific integrated circuit (ASIC), a field programmable gate array (FPGA)). The processor manages and schedules the modules and components in an OBU device. The access network device further includes at least one network interface 1105 or other communication interface, a memory 1106, and at least one bus system 1103. The components of the OBU are coupled via the bus system 1103. The bus system 1103 may include a data bus, a power bus, a control bus, a status signal bus and the like, but for clarity of description, various buses are labeled as a bus system 1103 in FIG. 13.

The method disclosed in the above embodiments of the present disclosure may be applied to the processor 1102 or used to execute an executable module stored in the memory 1106, such as a computer program. The memory 1006 may include a high-speed random access memory (RAM), or may include a non-volatile memory. The memory may include a read-only memory and a random access memory, and provides the processor with required signaling or data, programs, and the like. A portion of the memory may further include a non-volatile random access memory (NVRAM). A communication connection with at least one other network element is achieved via at least one network interface 1105 which may be wired or wireless.

In some embodiments, the memory 1106 stores the program 11061, and the processor 1102 executes the program 11061 to execute the following operations.

Access history information or subscription information of the terminal device is obtained via the network interface 1105.

The access history information or the subscription information is transmitted to a core network device via the network interface 1105, to cause the core network device to determine an access network device set based on the access history information or the subscription information and establish a network connection for the terminal device with each access network device in the access network device set, where the access network device set includes at least one access network device which the terminal device has ever accessed.

Alternatively, the processor 1102 may be configured to communicate with a network through context information received through a first access network device in the access network device set.

Alternatively, the processor 1102 may be configured to transmit the access history information or the subscription information to a core network device.

Alternatively, the access history information may include network statistics information of the access network device.

Alternatively, the processor 1102 may be configured to transmit a NAS signaling request message to the core network device via the network interface 1105, where the NAS signaling request message carries the access history information.

Alternatively, the network statistics information may include access network information.

Alternatively, the network statistics information may further include at least one of duration information or service type information.

Alternatively, the subscription information may include location area information.

Alternatively, the processor 1102 may be configured to transmit the subscription information to the core network device in an area update request message, an NAS signaling request message or an attach request message via the network interface 1105.

Alternatively, the subscription information may further include at least one of service type information or time information.

It can be seen from the above technical solution according to the embodiments of the present disclosure, the access history information or the subscription information of the terminal device is transmitted to the core network device, so that the core network device determines an access network device set including at least one access network device, and establishes a network connection for the terminal device with each access network device in the access network device set. Accordingly, each access network device in the access network device set can establish the network connection with the terminal device in advance, so that the terminal device can be moved seamlessly within coverage of the at least one access network device, thereby reducing the communication delay.

An embodiment of the present disclosure further provides a computer medium having stored thereon program instructions for instructing to implement any one of the above-described methods.

Alternatively, the storage medium may be specifically the memory 906, the memory 1006 or the memory 1106.

It should be understood that, the term "and/or" herein shows merely an association relationship for describing associated objects, indicating three possible relationships. For example, "A and/or B" may indicate the following three cases: A stands alone; both A and B exist; and B stands alone. In addition, the character "\" herein generally indicates that there is an "or" relationship between the associated object before and after the "\".

It should be understood that, in various embodiments of the present disclosure, a size of a sequence number of the above-described process does not mean an execution order. The execution order of each process should be determined based on a function and an inherent logic of the process, and should not limit implementations of the embodiments of the present disclosure.

Those skilled in the art may appreciate that, the units and algorithm steps in the examples described in conjunction with the embodiments disclosed herein can be implemented in electronic hardware or a combination of computer software and electronic hardware. Whether these functions are performed in hardware or software depends on the specific application and design constraints of the technical solution. Those skilled in the art may implement the described functions for each particular application by using different methods, but such implementation should not be considered to be beyond the scope of the present disclosure.

Those skilled in the art may clearly understand that, for the convenience and brevity of the description, the specific operation processes of the systems, the devices and the units described above may refer to the corresponding process in the foregoing method embodiments, and are not described here.

In the several embodiments according to the present disclosure, it should be understood that the disclosed systems, devices and methods may be implemented in other ways. For example, the device embodiments described above are merely illustrative. For example, the division of the units is only a division of logical functions, and there may be another division manner. For example, multiple units or components may be combined or may be integrate into another system, or some features can be ignored or not executed. In addition, the coupling, direct coupling or communication connection shown or discussed may be indirect coupling or communication connection via some interfaces, devices or units, and may be in an electrical, mechanical or other form.

The units described as separate components may or may not be physically separated. The components displayed as units may or may not be physical units. That is, they may be arranged in one place, or may be distributed to multiple network units. Some or all of the units may be selected according to actual needs to achieve the purpose of the solution of the embodiment.

In addition, functional units in embodiments of the present disclosure may be integrated into one processing unit, or each unit may exist physically separately, or two or more units may be integrated into one unit. The above integrated unit may be implemented in the form of hardware or in the form of a software functional unit.

The integrated units may be stored in a computer readable storage medium when being implemented in the form of a software functional unit and sold or used as an independent product. Based on such understanding, a part of the technical solution of the present disclosure, which is essential or makes a contribution to the related art, or a part of the technical solution, may be embodied in the form of a software product. The computer software product is stored in a storage medium, including several instructions to cause a computer device (which may be a personal computer, a server, a network device, or the like) to perform all or part of the steps of the communication method according to the embodiments of the present disclosure. The foregoing storage medium includes various media that may store program code, such as a U disk, a portable hard disk, a read-only memory (ROM), a random access memory (RAM), a magnetic disk, or an optical disk.

The foregoing is only a specific embodiment of the present disclosure, but the scope of protection of the present disclosure is not limited thereto. All the variations or alternatives that readily occur to any of those skilled in the art within the technical scope disclosed in the present disclosure, should be covered by the scope of protection of the present disclosure. Therefore, the scope of protection of the present disclosure is subject to the scope of protection of the claims.

The invention claimed is:

1. A communication method, comprising:
   determining, by a core network device, an access network device set, wherein the access network device set comprises at least one access network device which a terminal device has ever accessed; and
   establishing, by the core network device, a network connection for the terminal device with each access network device in the access network device set,
   wherein the determining, by the core network device, the access network device set comprises:
   receiving, by the core network device, access history information or subscription information of the terminal device sent by the terminal device; and
   determining, by the core network device, the access network device set based on the access history information or the subscription information.

2. The communication method of claim 1, wherein the establishing, by the core network device, the network connection for the terminal device with each access network device in the access network device set comprises:
   transmitting, by the core network device, a network connection request message to each access network device, to cause each access network device to establish the network connection with the terminal device based on the network connection request message.

3. The communication method of claim 1, further comprising:
   transmitting, by the core network device, context information to each access network device, to cause the terminal device to communicate with a network through the context information.

4. The communication method of claim 1, wherein the acquiring, by the core network device, the access history information of the terminal device comprises: acquiring, by the core network device, location information of the terminal device; and determining, by the core network device, the access history information based on a network topology diagram and the location information of the terminal device.

5. The communication method of claim 1, wherein the access history information comprises network statistic information of the access network device; wherein the determining, by the core network device, the access network device set based on the access history information comprises:
   determining, by the core network device, the access network device set based on the network statistics information.

6. The communication method of claim 5, wherein the network statistics information further comprises at least one of duration information or service type information.

7. The communication method of claim 1, wherein the subscription information comprises location area information;
   wherein the determining, by the network device, the access network device set based on the subscription information comprises:
   determining, by the core network device, the access network device set based on the location area information.

8. The communication method of claim 7, wherein the subscription information further comprises at least one of service type information or time information; wherein the determining, by the core network device, the access network device set based on the location area information comprises:
   determining, by the core network device, the access network device set based on the location area information and at least one of the service type information or the time information.

9. A communication method, comprising: transmitting, by a terminal device, access history information or subscription information of the terminal device to a core network device, to cause the core network device to determine an access network device set based on the access history information or the subscription information and establish a network connection for the terminal device with each access network device in the access network device set, wherein the access network device set comprises at least one access network device which the terminal device has ever accessed.

10. The communication method of claim 9, further comprising:
    performing, by the terminal device, network communication based on context information received through a first access network device in the access network device set.

11. The communication method of claim 9, wherein the transmitting, by the terminal device, the access history information or the subscription information to the core network device comprises:
    transmitting, by the terminal device, the access history information or the subscription information to the core network device via an access network device which the terminal device accesses.

12. The communication method of claim 9, wherein the access history information comprises network statistics information of the access network device.

13. The communication method of claim 12, wherein the transmitting, by the terminal device, the access history information to the core network device comprises: transmitting, by the terminal device, a non-access stratum (NAS) signaling request message to the core network device, wherein the NAS signaling request message carries the access history information.

14. The communication method of claim 12, wherein the network statistics information further comprises at least one of duration information or service type information.

15. The communication method of claim 9, wherein the subscription information comprises location area information.

16. The communication method of claim 15, wherein the transmitting, by the terminal device, the subscription information to the core network device comprises: transmitting, by the terminal device, the subscription information to the core network device in an area update request message, an NAS signaling request message or an attach request message.

17. The communication method of claim 15, wherein the subscription information further comprises at least one of service type information or time information.

18. A terminal device, comprising:
a processor; and
a memory storing instructions, which, when executed by the processor, cause the processor to execute one or more operations comprising:
acquiring access history information or subscription information of the terminal device; and
transmitting the access history information or the subscription information to a core network device obtained by the acquiring module, to cause the core network device to determine an access network device set based on the access history information or the subscription information and establish a network connection for the terminal device with each access network device in the access network device set, wherein the access network device set comprises at least one access network device which the terminal device has ever accessed.

\* \* \* \* \*